United States Patent
Takita et al.

(10) Patent No.: US 9,630,553 B2
(45) Date of Patent: Apr. 25, 2017

(54) STRUCTURE FOR ATTACHING COMPONENT TO PLATE-SHAPED MEMBER

(71) Applicant: HONDA ACCESS CORP., Niiza-shi, Saitama (JP)

(72) Inventors: Kazuya Takita, Niiza (JP); Shoji Yokoyama, Niiza (JP)

(73) Assignee: HONDA ACCESS CORP., Niiza-shi, Saitama (JP)

( * ) Notice: Subject to any disclaimer, the term of this patent is extended or adjusted under 35 U.S.C. 154(b) by 498 days.

(21) Appl. No.: 14/306,743

(22) Filed: Jun. 17, 2014

(65) Prior Publication Data

US 2015/0010345 A1    Jan. 8, 2015

(30) Foreign Application Priority Data

Jul. 8, 2013    (JP) .................................. 2013-142544

(51) Int. Cl.
*B60Q 3/02*        (2006.01)
*B60R 13/02*       (2006.01)
(Continued)

(52) U.S. Cl.
CPC ........ *B60Q 3/0203* (2013.01); *B60R 13/0206* (2013.01); *B60R 13/0212* (2013.01);
(Continued)

(58) Field of Classification Search
CPC  B60Q 3/0203; B60Q 3/0209; B60Q 2900/10; F16B 5/0607; F16B 5/0621;
(Continued)

(56) References Cited

U.S. PATENT DOCUMENTS

2005/0220560 A1 * 10/2005 Shinozaki ........... F16B 19/1081
                                                             411/37
2005/0258023 A1 * 11/2005 Nagai .................. B60Q 3/0203
                                                             200/339
(Continued)

FOREIGN PATENT DOCUMENTS

DE         3636364 C1 *  5/1987    ......... B60R 13/0206
DE   102005039936 A1 *  3/2007    ............. F16B 5/065
(Continued)

OTHER PUBLICATIONS

Japanese Office Action dated Oct. 15, 2014, issued in corresponding Japanese Application No. 2013-142544. (3 pages).

*Primary Examiner* — Jonathan Masinick
(74) *Attorney, Agent, or Firm* — Westerman, Hattori, Daniels & Adrian, LLP

(57) ABSTRACT

In a structure, which securely attaches a component to an opening portion in a plate-shaped member without stripping or turning over the plate-shaped member, each of a pair of mount members includes a first engagement portion engaged with a rear surface side of the plate-shaped member and a second engagement portion engaged with the component. The component includes projecting portions to be fitted between the mount members to enable fixing against coming off by engagement of the second engagement portion and the component. The projecting portions inhibit the mount members from moving so as not to come off the opening portion. Since the second engagement portion is formed from the multiple step portions engageable with the component, engagement with the component may be done even if plate thickness of the plate-shaped member varies, enabling fixing without backlash and improving versatility to the plate-shaped member having different plate thickness.

7 Claims, 9 Drawing Sheets

(51) Int. Cl.
*F16B 2/12* (2006.01)
*F16B 5/06* (2006.01)
*B60Q 9/00* (2006.01)

(52) U.S. Cl.
CPC .............. *F16B 2/12* (2013.01); *F16B 5/0642* (2013.01); *F16B 5/0664* (2013.01); *B60Q 9/006* (2013.01); *Y10T 403/595* (2015.01); *Y10T 403/70* (2015.01)

(58) Field of Classification Search
CPC .... F16B 5/0642; F16B 5/0657; F16B 5/0664; F16B 2005/0678; F16B 21/06; F16B 21/065
See application file for complete search history.

(56) References Cited

U.S. PATENT DOCUMENTS

2008/0011930 A1* 1/2008 Nagai .................. B60Q 3/0203
248/503
2009/0073707 A1* 3/2009 Nagai .................. B60Q 3/0203
362/490
2010/0157618 A1* 6/2010 Suzuki .................. B60Q 3/0203
362/548

FOREIGN PATENT DOCUMENTS

| | | | | |
|---|---|---|---|---|
| DE | WO 2010108614 A1 * | 9/2010 | .......... | F16B 19/1081 |
| FR | WO 2006087049 A1 * | 8/2006 | .......... | F16B 13/025 |
| JP | 08-135166 A | 5/1996 | | |
| JP | 2006-248432 A | 9/2006 | | |
| JP | 2008-006990 A | 1/2008 | | |
| JP | 2008-037413 A | 2/2008 | | |
| JP | 2008-069922 A | 3/2008 | | |
| JP | 2008-308087 A | 12/2008 | | |
| JP | 4407545 B2 | 2/2010 | | |
| JP | WO 2012096408 A1 * | 7/2012 | .......... | B60Q 3/0203 |
| JP | WO 2012111843 A1 * | 8/2012 | .......... | B60Q 3/0203 |
| JP | 2014-083937 A | 5/2014 | | |

* cited by examiner

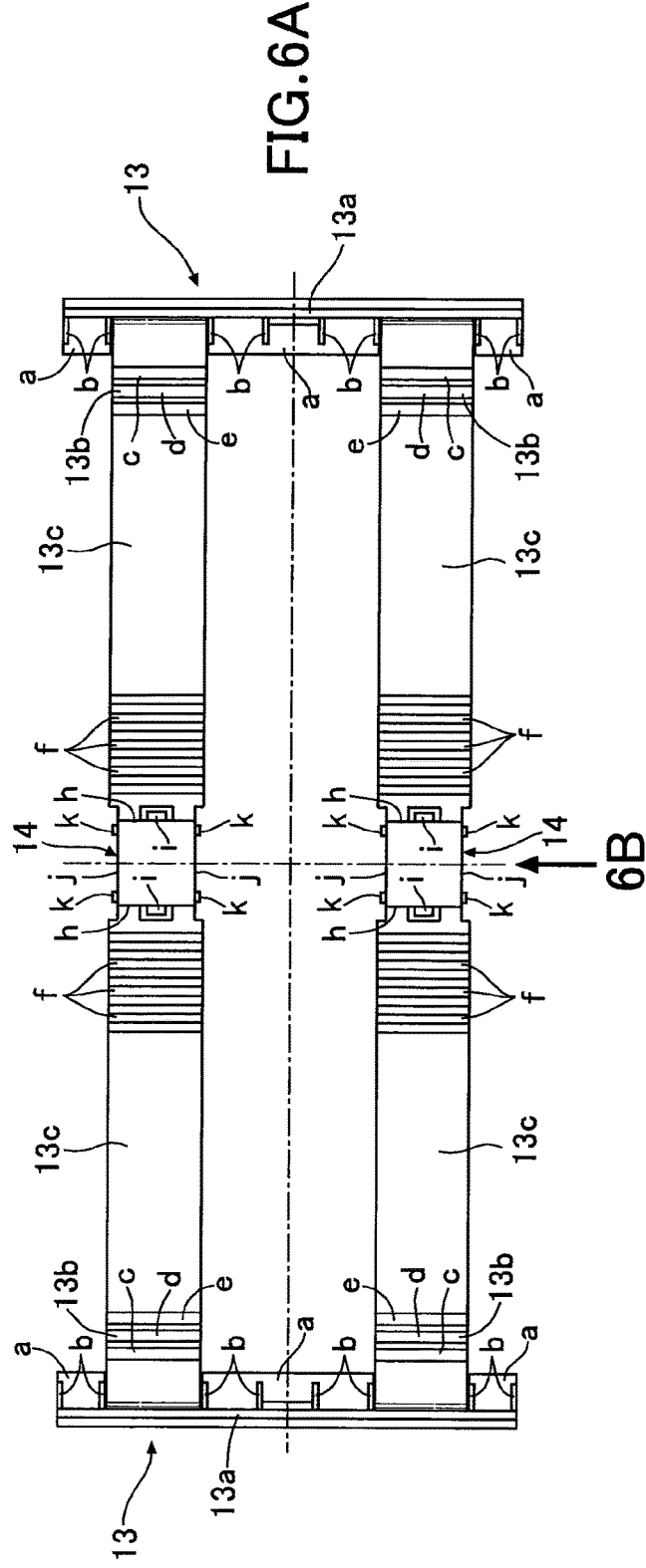

STRUCTURE FOR ATTACHING COMPONENT TO PLATE-SHAPED MEMBER

BACKGROUND OF THE INVENTION

Field of the Invention

The present invention relates to a structure for attaching a component to a plate-shaped member, in which a pair of mount members are respectively engaged with a pair of mutually-opposing edges of an opening portion made in a plate-shaped member, and a component is fixed to the pair of mount members from a front surface side of the plate-shaped member.

Description of the Related Art

As a conventional technique, Japanese Patent No. 4407545 describes a structure for attaching a component to a plate-shaped member, in which a design component is attached to a front surface side of a roof lining material (plate-shaped member) of an automobile by: placing a mount (mount member) on a back surface side of an opening portion made in the roof lining material; inserting insertion leg portions of the design component from the front surface side to the back surface side of the opening portion in the roof lining material; and bringing engaging claws at tip ends of the insertion leg portions into engagement with holes in the mount, respectively.

SUMMARY OF THE INVENTION

However, the structure for attaching a component to a plate-shaped member, which is described in Japanese Patent No. 4407545, requires the roof lining material to be stripped off from a roof panel and turned over in order to place the mount on the back surface side of the opening portion in the roof lining material, because the mount is larger in dimensions than the opening portion in the roof lining material. This causes problems such as an increase in working man-hours and damage to the roof lining material.

The present invention has been made with the foregoing case taken into consideration. An object of the present invention is to securely attach the component to the opening portion in the plate-shaped member without stripping or turning over the plate-shaped member.

In order to achieve the object, according to a first aspect of the present invention, there is provided a structure for attaching a component to a plate-shaped member, in which a pair of mount members are respectively engaged with a pair of mutually-opposing edges of an opening portion made in a plate-shaped member, and a component is fixed to the pair of mount members from a front surface side of the plate-shaped member, wherein each of said mount members includes: a first engagement portion to be engaged with a rear surface side of the plate-shaped member; and a second engagement portion to be engaged with the component, the component includes projecting portions to be fitted between the pair of mount members, and the second engagement portion is formed from a plurality of step portions capable of engaging with the component.

According to the configuration of the first aspect of the present invention, the component is fixed to the plate-shaped member by: engaging the pair of mount members respectively with the pair of mutually-opposing edges of the opening portion made in the plate-shaped member; and fixing the component to the pair of mount members from the front surface side of the plate-shaped member. At the time, since each of said mount members includes: the first engagement portion to be engaged with the rear surface side of the plate-shaped member; and the second engagement portion to be engaged with the component, and since the component includes the projecting portions to be fitted between the pair of mount members, the component can be fixed to the mount member from the front surface side of the plate-shaped member in a way that the component cannot come off the mount member by engaging the second engagement portion with the component without stripping or turning over the plate-shaped member. Furthermore, since the projecting portions of the component inhibit the pair of mount members in engagement with the opening portion from moving in directions in which the pair of mount members come closer to each other, the pair of mount members can be prevented from coming off the opening portion. Moreover, since the second engagement portion is formed from the multiple step portions capable of engaging with the component, any one of the multiple step portions is engaged with the component no matter how much plate thickness of the plate-shaped member varies. Thereby, not only can fixing without backlash be achieved, but also versatility to the plate-shaped member having different plate thickness can be improved.

According to a second aspect of the present invention, in addition to the first aspect, the second engagement portion is formed from a plurality of mutually-parallel projecting portions capable of engaging with the component.

According to the configuration of the second aspect of the present invention, since the second engagement portion is formed from the multiple mutually-parallel projecting portions capable of engaging with the component, it is possible to securely engage the second engagement portion with the component to prevent the engagement from becoming loose.

According to a third aspect of the present invention, in addition to the first or second aspect, each of said mount members includes a handle portion extending toward the front surface side of the plate-shaped member while in engagement with the opening portion, and the second engagement portion is engaged with the component by pulling the handle portion toward the front surface side of the plate-shaped member.

According to the configuration of the third aspect of the present invention, since each of said mount members includes the handle portion extending toward the front surface side of the plate-shaped member while in engagement with the opening portion, an operator can easily engage the second engagement portion with the component by: pinching the handle portion with fingertips; and pulling the handle portion toward the front surface side of the plate-shaped member. Accordingly, workability is improved.

According to a fourth aspect of the present invention, in addition to the third aspect, the handle portion includes a non-slipping rugged portion.

According to the configuration of the fourth aspect of the present invention, since the handle portion includes the non-slipping rugged portion, the fingertips of the operator can be prevented from slipping over the handle portion when the operator engages the second engagement portion with the component by pulling the handle portion toward the front surface side of the plate-shaped member. Accordingly, the workability is further improved.

According to a fifth aspect of the present invention, in addition to the first or second feature, each of said mount members includes an erected wall portion to come into contact with an inner wall surface of the opening portion, and a rib capable of biting into the inner wall surface of the opening portion is projectingly provided on the erected wall portion.

According to the configuration of the fifth aspect of the present invention, since each of said mount members includes the erected wall portion to come into contact with the inner wall surface of the opening portion, and since the rib capable of biting into the inner wall surface of the opening portion is projectingly provided on the erected wall portion, an attitude of the mount member can be stabilized by making the rib of the erected wall portion bite into the inner wall surface of the opening portion even if dimensions of the opening portion vary. Accordingly, work of attaching the component to the mount member can be easily fulfilled.

It should be noted that: a roof lining 11 of an embodiment corresponds to the plate-shaped member of the present invention; a base member 15 of the embodiment corresponds to the component of the present invention; and projecting portions c, d, e of the embodiment correspond to the step portions of the present invention.

The above and other objects, characteristics and advantages of the present invention will be clear from detailed descriptions of the preferred embodiment which will be provided below while referring to the attached drawings.

BRIEF DESCRIPTION OF THE DRAWINGS

FIG. 6A is a view taken in a direction of an arrow 6A in FIG. 5A and FIG. 6B is a view taken in a direction of an arrow 6B in FIG. 6A.

DESCRIPTION OF THE PREFERRED EMBODIMENT

Descriptions will be hereinbelow provided for an embodiment of the present invention on the basis of FIGS. 1 to 9.

Figure 1:
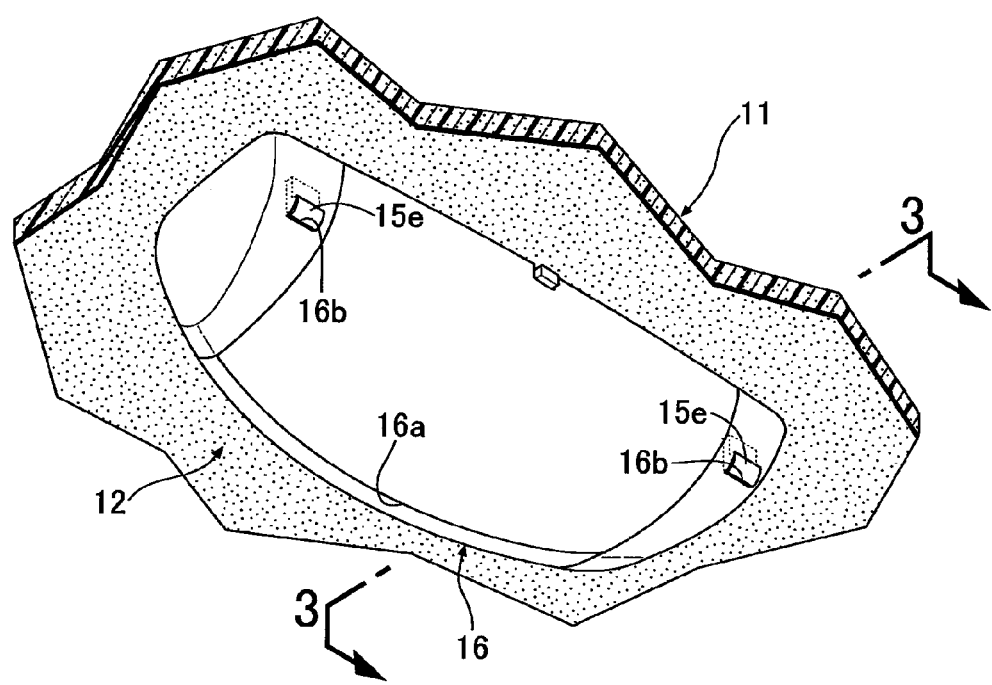
FIG. 1 is a perspective view of an indicator attached to an undersurface of a roof of an automobile (viewed in a direction of an arrow 1 in FIG. 9).
Figure 9:
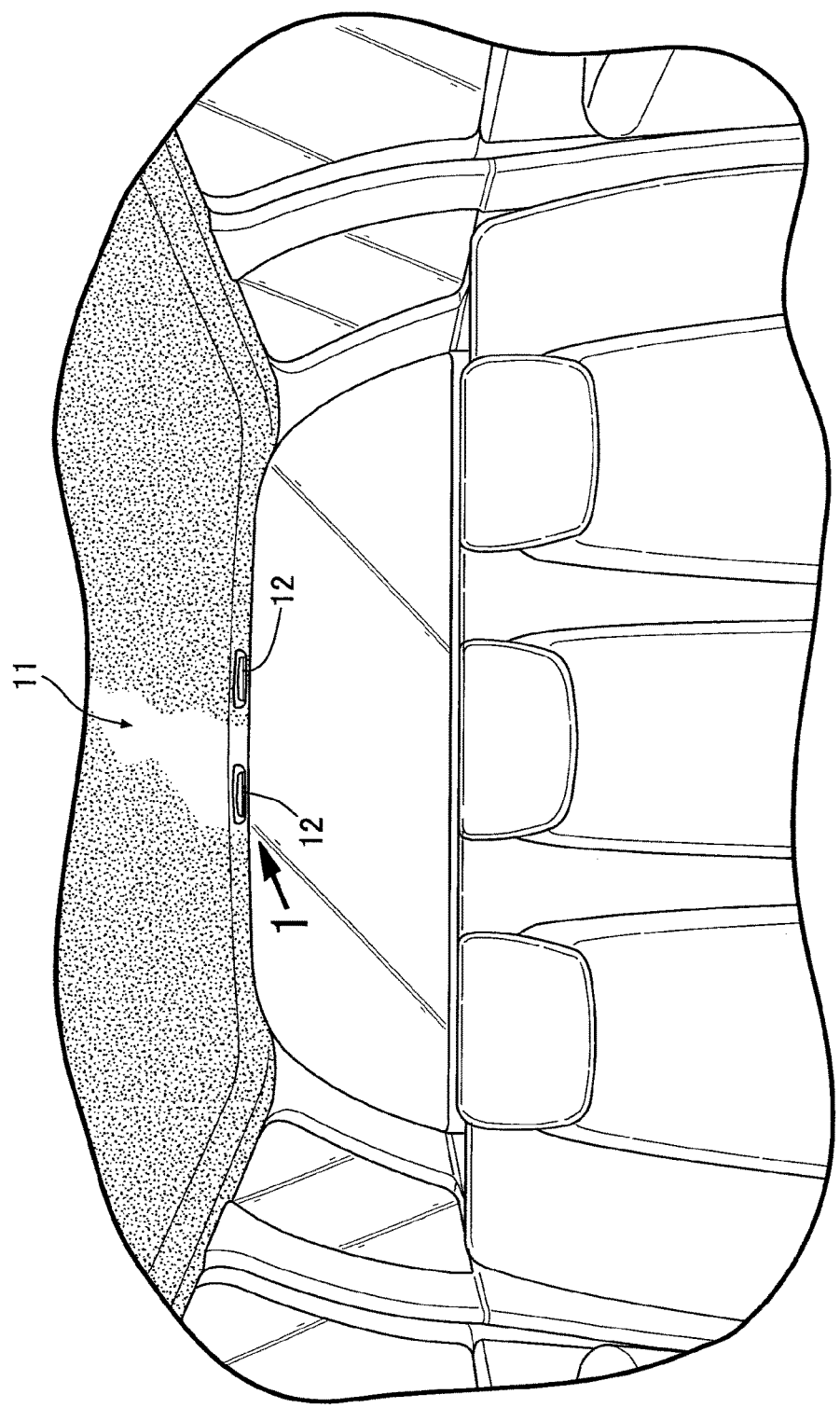
FIG. 9 is a view of an undersurface of a rear portion of the roof of the automobile, as viewed from inside a vehicle compartment.

As shown in FIGS. 1 and 9, a surface of an automobile roof on a vehicle compartment side is covered with a roof lining 11 made from soft urethane foam resin or the like. A pair of left and right indicators 12 are attached to the roof lining 11 on a rear portion of the roof. While the vehicle is moving backward for its parking in a garage, or the like, the left indicator 12 turns on once an obstacle sensor provided in a rear bumper on the left side detects an obstacle, and the right indicator 12 turns on once an obstacle sensor provided in the rear bumper on the right side detects an obstacle. For this reason, a driver can avoid getting the vehicle into contact with the obstacle by checking via a room mirror whether the indicators 12 turn on. The indicators 12 are provided as optional accessories, and are attached to the roof lining 11 depending on the necessity after the automobile is finished.

Next, descriptions will be provided for a structure for attaching the indicators 12 to the roof lining 11 on the basis of FIGS. 2 to 6B.

When the roof lining 11 is stripped off or turned over in order to attach the indicators 12, it is likely that the work becomes difficult and the roof lining 11 is damaged. The embodiment, however, makes it possible to attach the indicators 12 to the roof lining 11 while leaving the roof lining 11 as it is, without stripping or turning over it. To this end, a rectangular opening portion 11a is formed by cutting part of the roof lining 11 off with a cutter knife or the like (see FIG. 2).

FIGS. 5A to 6B show mount members 13 and push blocks 14 for attaching the indicators 12. Two mount members 13 and two push blocks 14 needed to attach one indicator 12 are integrally molded out of synthetic resin. The integrally molded product is cut along cutting lines L1 into four parts in total.

Each mount member 13 includes: a first engagement portion 13a in a rectangular plate shape; a pair of second engagement portions 13b projecting from the first engagement portion 13a at a right angle; and a pair of handle portions 13c extending in a direction of extending the pair of second engagement portions 13b.

The first engagement portion 13a is provided with three erected wall portions a which project in the same direction as the second engagement portions 13b project. Multiple triangular ribs b are projectingly provided on each erected wall portion a. Each second engagement portion 13b is formed from three projecting portions c, d, e extending in parallel with the first engagement portion 13a. Each handle portion 13c is a belt-shaped member, and non-slipping rugged portions f are formed in an end portion of the handle portion 13c on a side farther from the second engagement portion 13b.

Each push block 14 is a cuboid member, one of whose surfaces is opened. An inside of the push block 14 is partitioned by a partition wall g. A pair of lateral surfaces h, between which the partition wall g is interposed, are each provided with one elastically-deformable engaging claw i. Furthermore, the other pair of lateral surfaces j, which continue to the pair of lateral surfaces h, are each provided with two projecting wedge-shaped ribs k.

Figure 2:
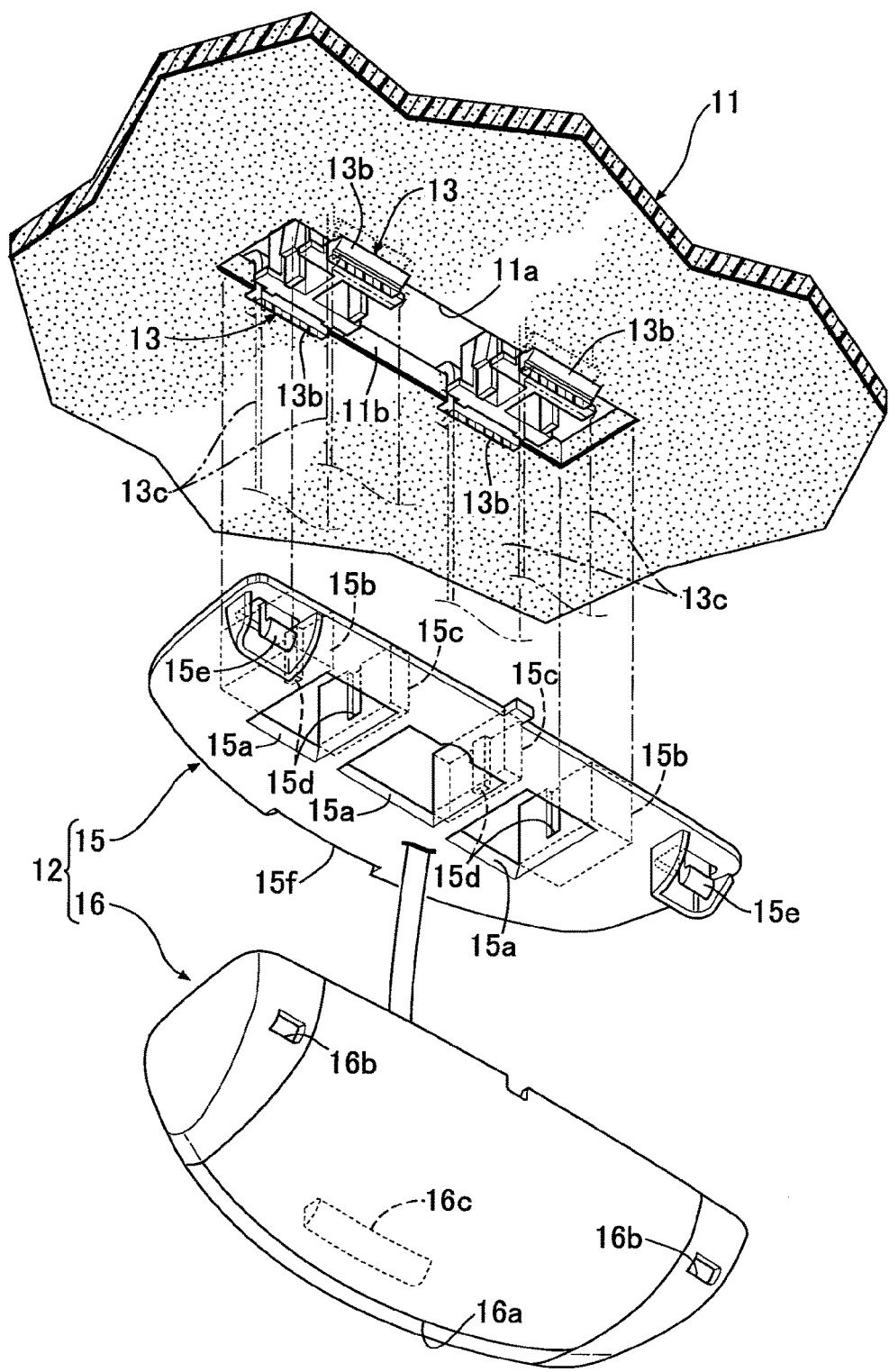
FIG. 2 is an exploded perspective view of the indicator.
Figure 3:
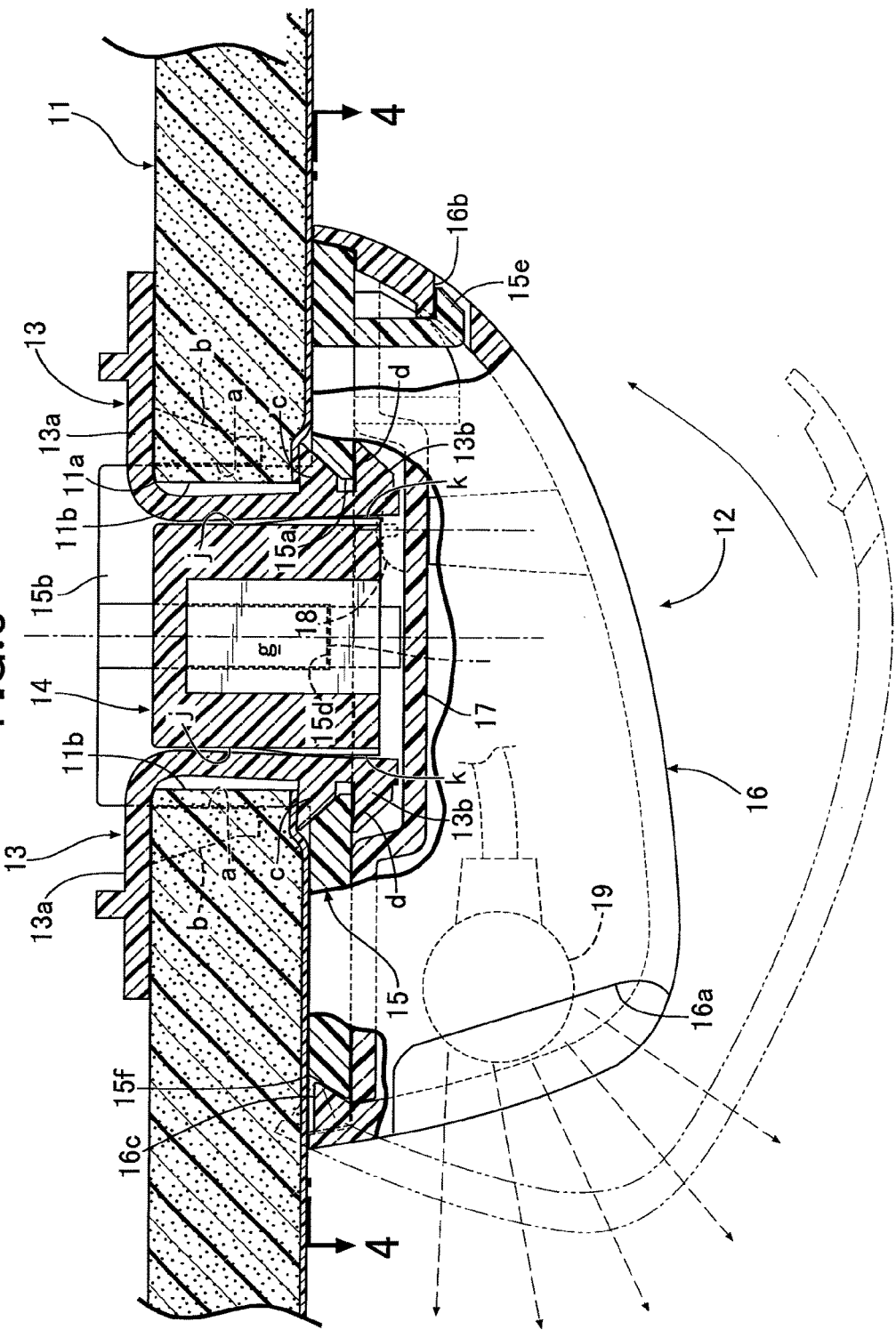
FIG. 3 is a sectional view taken along a 3-3 line in FIG. 1.
Figure 4:
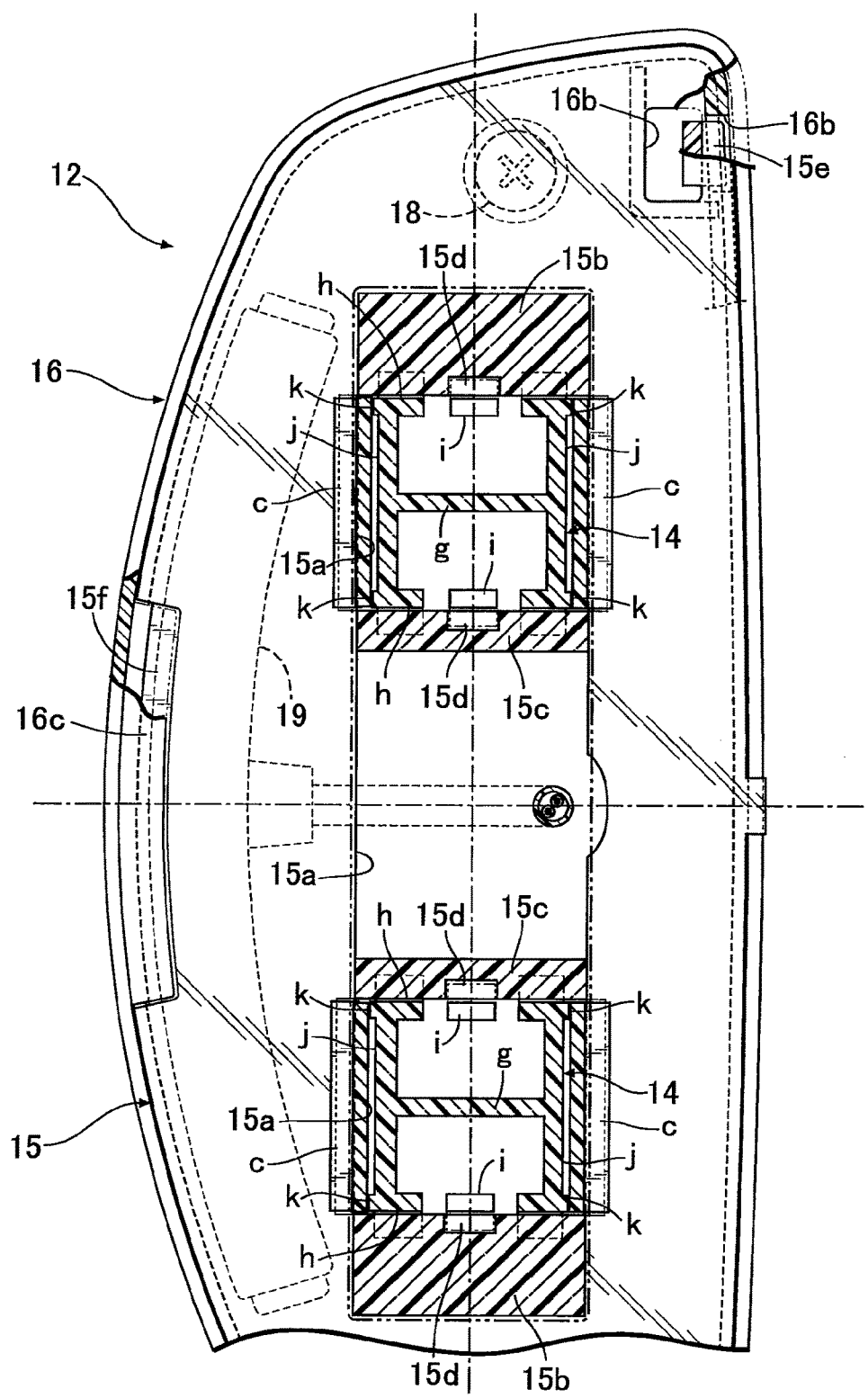
FIG. 4 is a sectional view taken along a 4-4 line in FIG. 3

As shown in FIGS. 2 to 4, the indicator 12 includes: a plate-shaped base member 15; and an indicator body portion 16 detachably attached to the base member 15. A rectangular opening portion 15a is formed in the base member 15. Four plate-shaped projecting portions 15b, 15c are formed, respectively, in opposite end portions and two intermediate portions of the opening portion 15a in its longitudinal direction. Step-shaped engaged portions 15d with which the engaging claws i of the push block 14 are able to be engaged, respectively, are formed, respectively, in mutually-opposing surfaces of each pair of the projecting portions 15b, 15c. Furthermore, a pair of engaging claws 15e are formed, respectively, in opposite end portions of the base member 15 in its longitudinal direction. Moreover, one cutout 15f is made in an intermediate portion of the base member 15 in its longitudinal direction.

The indicator body portion 16 is a member in a container shape, whose upper surface is opened. A transparent window portion 16a is formed in a part of the indicator body portion 16. A substrate 17 is fixed to an inside of the indicator body portion 16 with two bolts 18 (see FIG. 4). A light emitting body 19 like an LED is provided on an undersurface of the substrate 17. Furthermore, a pair of engagement holes 16b, with which the engaging claws 15e of the base member 15 are able to be engaged, respectively, and one engaging claw 16c capable of being engaged with the cutout 15f in the base member 15 are formed in the indicator body portion 16.

Next, descriptions will be provided for an operation of the embodiment of the present invention having the foregoing configuration.

To begin with, descriptions will be provided for how the mount members 13 and the base member 15 are attached to the opening portion 11a in the roof lining 11.

Figure 5A:
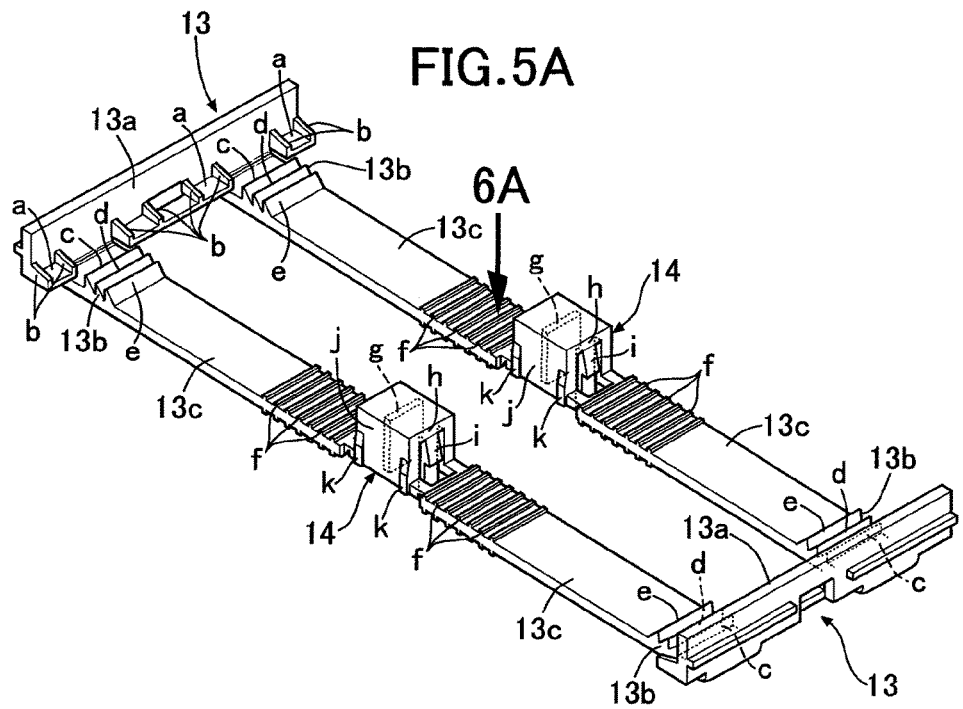
FIGS. 5A and 5B are perspective views of mount members and push blocks.
Figure 5B:
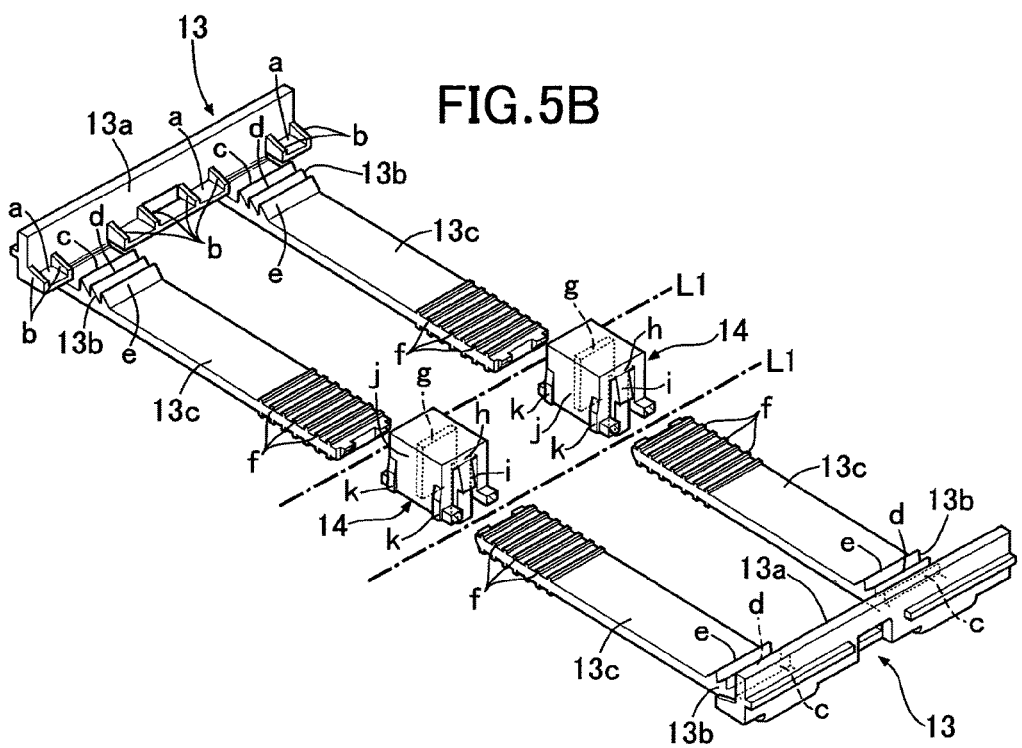
Figure 7A:
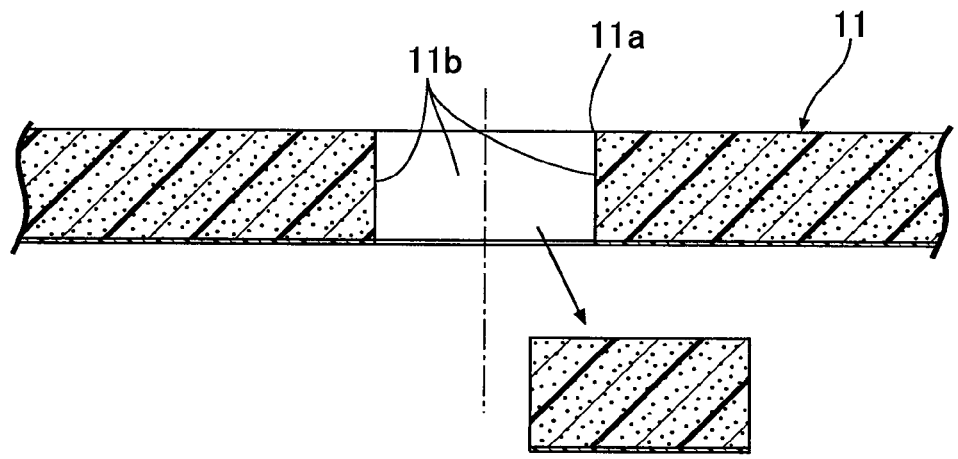
FIGS. 7A and 7B are explanatory views (Part 1) showing how a base member is mounted.
Figure 7B:
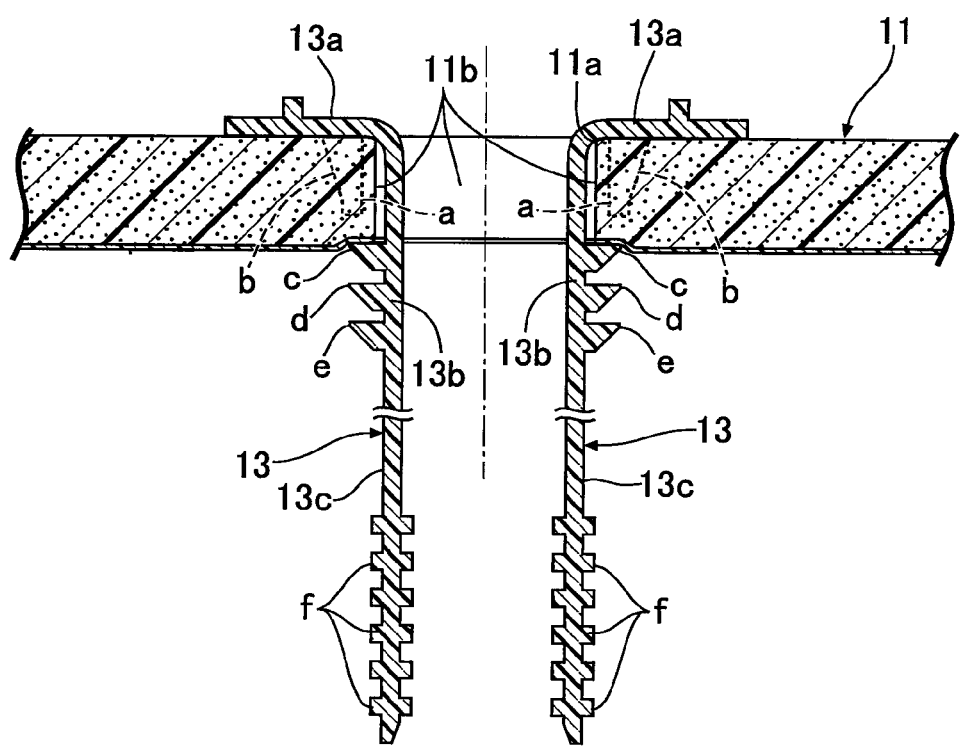

As shown in FIGS. 5A and 5B, the product of the pair of mount members 13 and the pair of push blocks 14 which are integrally molded out of the resin is beforehand cut along cutting lines L1. Subsequently, as shown in FIG. 7A, the rectangular opening portion 11a is formed in the roof lining 11 with a cutter knife or the like. Thereafter, as shown in FIG. 7B, the first engagement portions 13a of the pair of mount members 13 are made to pass through the opening portion 11a from a front surface (undersurface) side to a back surface (top surface) side of the roof lining 11, and the ribs b of the erected wall portions a provided on the first engagement portions 13a (see FIGS. 5A and 5B) are made to bite into the inner wall surfaces 11b of the opening portion 11a. Thereby, the mount members 13 are positioned with respect to the opening portion 11a.

At this time, depending on thickness of the roof lining 11, only the uppermost projecting portion c of the three projecting portions c, d, e on each second engagement portion 13b may bite into the inner wall surface 11b, or two of them, such as the uppermost and middle projecting portions c, d may bite into the inner wall surface 11b. Thereby, the mount members 13 are stably supported in the opening portion 11a.

Figure 8A:
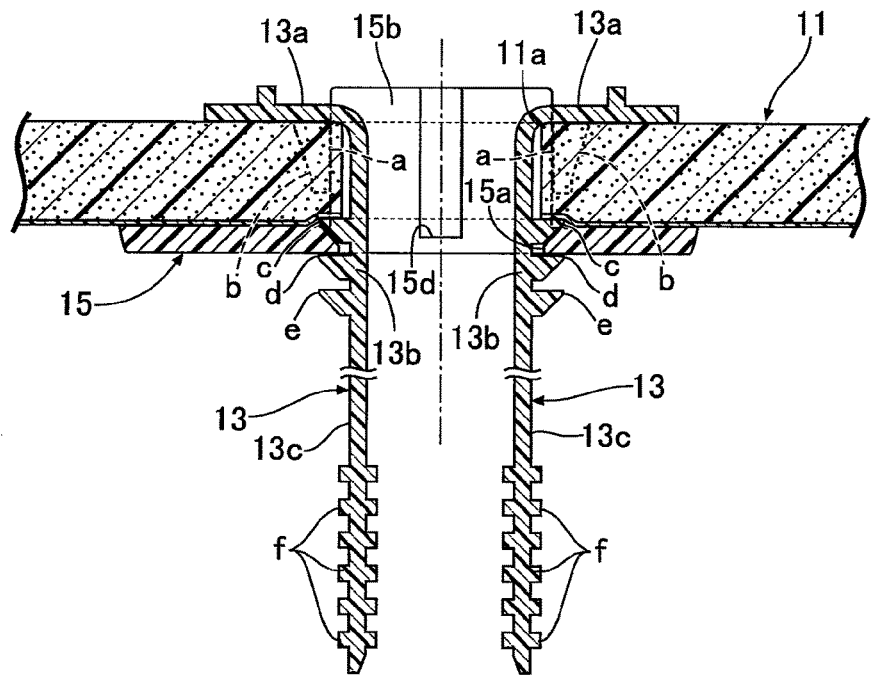
FIGS. 8A and 8B are explanatory views (Part 2) showing how the base member is mounted.

Subsequently, as shown in FIG. 8A, the opening portion 15a in the base member 15 of the indicator 12 is slid from bottom to top along the two pairs of handle portions 13c extending downward from the second engagement portions 13b of the pair of mount members 13. Thereafter, while the base member 15 is pressed against an undersurface of the roof lining 11 by pushing an undersurface of the base member 15 upward with fingers, the handle portions 13c are pinched with fingers and pulled downward. Thereby, the lowermost projecting portion e and the middle projecting portion d of the three projecting portions c, d, e of each second engagement portion 13b go over the opening portion 15a in the base member 15, and the middle projecting portion d is engaged with the opening portion 15a. As a result, the roof lining 11 is held between the first engagement portions 13a and the base member 15, and the base member 15 is fixed to the roof lining 11.

Simultaneously, the projecting portions 15b, 15c of the base member 15 are fitted between the erected wall portions a of the first engagement portions 13a of the pair of mount members 13. This restrains the pair of mount members 13 from moving in directions in which the mount members 13 come closer to each other.

Depending on the thickness of the roof lining 11, the uppermost projecting portion c of each second engagement portion 13b may be engaged with the opening portion 15a of the base member 15, or the lowermost projecting portion e of each second engagement portion 13b may be engaged with the opening portion 15a. Moreover, in a case where the thickness of the roof lining 11 differs locally, any of the projecting portions c, d, e of each second engagement portion 13b, which is different between one and the other of the pair of mount members 13, may be engaged with the opening portion 15a of the base member 15.

Figure 8B:
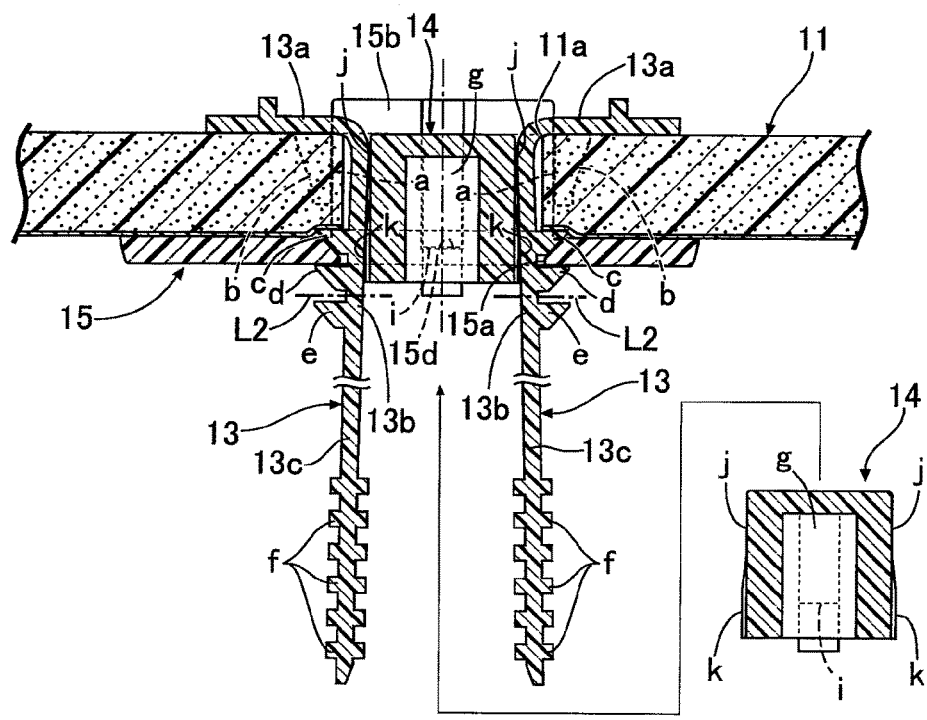

Subsequently, as shown in FIG. 8B, the two push blocks 14 are pushed from bottom into a space between the mutually-opposing two pairs of second engagement portions 13b of the pair of mount members 13. Thereby, the pair of engaging claws i of each push block 14 are interposed between opposing surfaces of the corresponding pair of projecting portions 15b, 15c of the base member 15, and are elastically deformed in directions in which the engaging claws i come closer to each other. Thereafter, the engaging claws i go over the engaged portions 15d formed in the opposing surfaces, and return to their original shapes by resilience of their own so as to be engaged with the engaged portions 15d, respectively. As a result, each push block 14 is fixed between the pair of second engagement portions 13b. At this time, since the ribs k projectingly provided on the lateral sides j of the push block 14 play a function as a wedge and push the pair of the second engagement portions 13b open, insertion of the push block 14 can be achieved easily.

Finally, the handle portions 13c projecting downward from the base member 15 are separated from the second engagement portions 13b by being cut along cutting lines L2.

After the base member 15 is fixed to the roof lining 11 by use of the mount members 13 and the push blocks 14 as described above, the indicator body portion 16 is swung, with the engaging claw 16c of the indicator body portion 16 as a fulcrum, to a place overlapping the base member 15 in a state where the engaging claw 16c is engaged with the cutout 15f in the base member 15. Accordingly, the engagement holes 16b in the indicator body portion 16 are engaged with the engaging claws 15e of the base member 15, respectively, so that the indicator body portion 16 is fixed to the base member 15 (see FIG. 3).

According to the embodiment, as described above, since the bisected mount members 13 are attached to the opening portion 11a of the roof lining 11 from the front surface side of the roof lining 11, each mount member 13 in the reduced size can be engaged with the opening portion 11a. Accordingly, the attachment of the mount members 13 can be achieved without stripping or turning over the roof lining 11.

In addition, since the base member 15 includes the projecting portions 15b, 15c which are capable of being fitted between the erected wall portions a of the first engagement portions 13a of the pair of mount members 13, it is possible to securely prevent the bisected mount members 13 from: moving in the directions in which the mount members 13 come closer to each other; and coming off the opening portion 11a. Thus, it is possible to increase attaching strength of the indicator 12 and the base member 15. Furthermore, since the push blocks 14 are fitted between the second engagement portions 13b of the pair of mount members 13, it is possible to block disengagement of the second engagement portions 13b and the base member 15 from each other, and to increase attaching strength of the base member 15 to the roof lining 11.

Meanwhile, there is an idea that the push blocks 14 are integrally provided to the indicator body portion 16. This configuration, however, makes each push block 14 fitted between the pair of second engagement portions 13b while drawing an arc-shaped track since the indicator body portion 16 is engaged with the base member 15 while swinging with the engaging claw 16c as the fulcrum. As a consequence, the push blocks 14 may not be smoothly fitted. In contrast, in the embodiment, since the push blocks 14 are formed from the members separated from the indicator body portion 16, work of fitting each push block 14 between the pair of second engagement portions 13b can be achieved easily.

Furthermore, since the push blocks 14 include the engaging claws i which are engaged with the engaged portions 15d of the base member 15, it is possible to securely prevent the push blocks 14 from coming off the base member 15. Since the pair of engaging claws i are released from their engagement with the engaged portions 15d only by being pinched and brought closer to each other, the push blocks 14, once engaged, can be easily detached by manipulating the pair of engaging claws i from the front surface side of the roof lining 11.

Moreover, since each second engagement portion 13b is formed from the three projecting portions c, d, e which are capable of engaging with the base member 15, any one of the three projecting portions c, d, e is engaged with the base member 15 no matter how much the plate thickness of the roof lining 11 varies depending on types or locations. Thereby, not only can fixing without backlash be achieved, but also versatility to the roof lining 11 having different plate thickness can be improved.

In addition, since each mount member 13 includes the handle portions 13c extending toward the front surface side of the roof lining 11 while in engagement with the opening portion 11a of the roof lining 11, an operator can easily engage the second engagement portions 13b with the base member 15 by: pinching the handle portions 13c with fingertips; and pulling them toward the front surface side of the roof lining 11. Accordingly, workability is improved. In particular, since the handle portions 13c are provided with the non-slipping rugged portions f, the fingertips can be prevented from slipping over the handle portions 13c when the operator pulls the handle portions 13c. Accordingly, the workability is further improved.

Furthermore, each mount member 13 includes the erected wall portions a which come into contact with the corresponding inner wall surface 11b of the opening portion 11a of the roof lining 11, and the ribs b capable of biting into the inner wall surface 11b of the opening portion 11a are projectingly provided on each erected wall portion a. Accordingly, an attitude of the mount member 13 can be stabilized by making the ribs b of the erected wall portions a bite into the inner wall surface 11b of the opening portion 11a even if dimensions of the opening portion 11a vary. Work of attaching the base member 15 to the mount member 13 can be easily fulfilled.

Moreover, since the push blocks 14 are fitted between the two pairs of second engagement portions 13b of the pair of mount members 13 whose first engagement portions 13a are in engagement with the opening portion 11a of the roof lining 11, the push blocks 14 inhibit the two pairs of second engagement portions 13b from: moving in the directions in which the second engagement portions 13b come closer to each other; and disengagement from the base member 15. Thereby, it is possible to more securely prevent the base member 15 from coming off.

In addition, since the mount members 13 and the push blocks 14 are integrally molded out of the resin and are cut apart when put into use, it is possible not only to reduce a cost of a mold for molding the mount members 13 and the push blocks 14, but also to prevent the mount members 13 and the push blocks 14 from being lost due to being separated from each other before their use.

Although the foregoing descriptions have been provided for the embodiment of the present invention, various design changes can be made without departing from the gist of the present invention.

For example, the plate-shaped member of the present invention is not limited to the roof lining 11 of the embodiment.

In addition, the component of the present invention is not limited to the base member 15 of the indicator 12 of the embodiment.

Furthermore, although, in the embodiment, each second engagement portion 3b includes the three projecting portions c, d, e, the number of projecting portions c, d, e may be two or more, but is not limited to the three.

Moreover, although, in the embodiment, each second engagement portion 13b is formed from the projections extending in parallel with one another, the second engagement portion 13 may be formed from multiple grooves or recessed portions. In other words, each second engagement portion of the present invention may be made from multiple step portions with which the component is capable of engaging.

What is claimed is:

1. A structure for attaching a component to a plate-shaped member, in which a pair of mount members are respectively engaged with a pair of mutually-opposing edges of an opening portion made in a plate-shaped member, and a component is fixed to the pair of mount members from a front surface side of the plate-shaped member, wherein
   each of said mount members includes: a first engagement portion to be engaged with a rear surface side of the plate-shaped member; and a second engagement portion to be engaged with the component,
   the component includes projecting portions to be fitted between the pair of mount members, and
   the second engagement portion is formed from a plurality of step portions capable of engaging with the component.

2. The structure for attaching a component to a plate-shaped member according to claim 1, wherein the second engagement portion is formed from a plurality of mutually-parallel projecting portions capable of engaging with the component.

3. The structure for attaching a component to a plate-shaped member according to claim 2, wherein
   each of said mount members includes a handle portion extending toward the front surface side of the plate-shaped member while in engagement with the opening portion, and
   the second engagement portion is engaged with the component by pulling the handle portion toward the front surface side of the plate-shaped member.

4. The structure for attaching a component to a plate-shaped member according to claim 2, wherein
   each of said mount members includes an erected wall portion to come into contact with an inner wall surface of the opening portion, and
   a rib capable of biting into the inner wall surface of the opening portion is projectingly provided on the erected wall portion.

5. The structure for attaching a component to a plate-shaped member according to claim 1, wherein
   each of said mount members includes a handle portion extending toward the front surface side of the plate-shaped member while in engagement with the opening portion, and
   the second engagement portion is engaged with the component by pulling the handle portion toward the front surface side of the plate-shaped member.

6. The structure for attaching a component to a plate-shaped member according to claim 5, wherein the handle portion includes a non-slipping rugged portion.

7. The structure for attaching a component to a plate-shaped member according to claim 1, wherein each of said mount members includes an erected wall portion to come into contact with an inner wall surface of the opening portion, and a rib capable of biting into the inner wall surface of the opening portion is projectingly provided on the erected wall portion.

* * * * *